United States Patent
Fecht et al.

(10) Patent No.: US 7,480,681 B2
(45) Date of Patent: Jan. 20, 2009

(54) SYSTEM AND METHOD FOR A TRANSACTION MANAGER

(75) Inventors: Christian Fecht, Walldorf (DE); Dietmar Theobald, Karlsruhe (DE); Juergen Heymann, Leiman (DE); Thomas Raupp, Karlsdorf-Neuthard (DE); Rainer Brendle, Neckargemuend (DE)

(73) Assignee: SAP AG, Walldorf (DE)

( * ) Notice: Subject to any disclaimer, the term of this patent is extended or adjusted under 35 U.S.C. 154(b) by 215 days.

(21) Appl. No.: 11/005,950

(22) Filed: Dec. 6, 2004

(65) Prior Publication Data
US 2006/0122966 A1 Jun. 8, 2006

(51) Int. Cl.
*G06F 17/30* (2006.01)
(52) U.S. Cl. ...................................................... 707/202
(58) Field of Classification Search ............... 707/1–10, 707/200, 202, 100, 101; 709/203; 714/15
See application file for complete search history.

(56) References Cited

U.S. PATENT DOCUMENTS

| | | | | |
|---|---|---|---|---|
| 5,832,512 A | * | 11/1998 | Mastors et al. | 707/202 |
| 6,026,406 A | * | 2/2000 | Huang et al. | 707/100 |
| 7,003,776 B2 | * | 2/2006 | Sutherland | 709/201 |
| 2003/0036919 A1 | | 2/2003 | Felt et al. | |
| 2003/0046342 A1 | | 3/2003 | Felt et al. | |
| 2003/0050972 A1 | * | 3/2003 | Felt et al. | 709/203 |
| 2004/0002966 A1 | * | 1/2004 | Perkowski | 707/3 |
| 2004/0220916 A1 | * | 11/2004 | Thess et al. | 707/3 |
| 2006/0074977 A1 | * | 4/2006 | Kothuri et al. | 707/104.1 |
| 2006/0149876 A1 | | 7/2006 | Fecht et al. | |

* cited by examiner

*Primary Examiner*—Mohammad Ali
*Assistant Examiner*—Marc R Filipczyk
(74) *Attorney, Agent, or Firm*—Blakely Sokoloff Taylor & Zafman

(57) ABSTRACT

Embodiments of the invention are generally directed to a system and method for a transaction manager. A transaction manager registers one or more callback methods each having an associated synchronization identifier. An order is defined for the one or more callback methods based, at least in part, on the synchronization identifier associated with each callback method. The callback methods are called in the defined order.

23 Claims, 9 Drawing Sheets

```
public void doSomethingWithDB() throws ApplicationException, SQLException
{
    // transaction header    ←——— 210
    // Ticket denoting both the transaction and its 'owning location' (this method).
    try {
        // Open a transaction if none does yet exist.
        final TransactionTicket txticket;    ←——— 212
        txticket = TxMgr.required();    ←——

// transaction body              214
        try {
            // Do the real work with connections, database queries, updates etc.
            Connection conn = datasource.getConnection();

... // ... do whatever

// Demo fragment: perform some consistency check and report failure, if any.
            // Usually, applications are expected to throw an exception.
            if ( ! dataIsConsistent() ) {
  222 ———▶    TxMgr.setRollbackOnly();
                throw new SomeApplicationException("..");
            }

```
220 ─┐
    // transaction footer
            // When all is fine, then commit this 'required' level. If a transaction has
            // been started above, either commit or rollback that transaction.
            // In case an error had been detected, e.g. due to a consistency check or when
            // catching an exception, setRollbackOnly() is supposed to have been called
            // for reporting the failure to the TxMgr.
224 ──▶  TxMgr.commitLevel(txticket);

// Between commitLevel(txticket) and leaveLevel(txticket), no TxMgr
        // operations are allowed, except getStatus().
        }
        // Demo fragment: handle TxMgr exceptions explicitly. If not handled, TxException
        // has to be listed in this method's throws clause (not recommended).
        // In this sample, handling of exceptions involves re-mapping them into an
        // application exception, passing the original exception as cause.
        } catch (TxRollbackException e) {
                ...
                throw new SomeApplicationException(e);
        } catch (TxException e) {
                ...
                throw new SomeApplicationException(e);
        }
        } finally {
                // Leave this level of the demarcated transactions stack. Rollback if
                // commitLevel(txticket) has not been invoked, either by direct rollback if
                // the transaction has been started here, or by setRollbackOnly(), otherwise.
226 ──▶          TxMgr.leaveLevel(txticket);
        }
}
// Handle a failure in opening requires() and in closing leaveLevel().
catch (TxException e)
{
        throw new SomeApplicationException(e);
}
}
```

*FIG. 2B*

```
public void doSomethingWithDB() throws ApplicationException, SQLException
{
  // transaction header
  // Ticket denoting both the transaction and its 'owning location' (this method).
  try {
          // Always open a new TX (stack, e.g., suspend the previous).
          final TransactionTicket txticket;
          txticket = TxMgr.requiresNew();

// transaction body                    310
          try {
                  // Do the real work with connections, database queries, updates etc.
                  Connection conn = datasource.getConnection();

. . . // ... do whatever

// Demo fragment: perform some consistency check and report
  failure, if any.
                  // Usually, applications are expected to throw an exception.
                  if ( ! dataIsConsistent() ) {
                          TxMgr.setRollbackOnly();
                          throw new SomeApplicationException("..");
                  }

```
        // transaction footer
            // Since this TX was a stacked TX, the commit below will always do either
            // a real commit or rollback. txticket denotes the TX instance.
            // In case an error had been detected, e.g. due to a consistency check or when
            // catching an exception, setRollbackOnly() is supposed to have been called
            // for reporting the failure to the TxMgr.
312 ──► TxMgr.commitLevel(txticket);

// Between commitLevel(txticket) and leaveLevel(txticket), no TxMgr
        // operations are allowed, except getStatus().
        }
        // Demo fragment: handle TxMgr exceptions explicitly. If not handled, TxException
        // has to be listed in this method's throws clause (not recommended).
        // In this sample, handling of exceptions involves re-mapping them into an
        // application exception, passing the original exception as cause.
        } catch (TxRollbackException e) {
            ...
            throw new SomeApplicationException(e);
        } catch (TxException e) {
            ...
            throw new SomeApplicationException(e);
        }
        } finally {
            // Leave this level of the demarcated transactions stack. Rollback if
            // commitLevel(txticket) has not been invoked, either by direct rollback if
            // the transaction has been started here, or by setRollbackOnly(), otherwise.
314 ──►    TxMgr.leaveLevel(txticket);
        }
    }
    // Handle a failure in opening requires() and in closing leaveLevel().
    catch (TxException e)
    {
        throw new SomeApplicationException(e);
    }
}
```

FIG. 3B

```
Transaction Manager Interface 400 interface ... .TXMgr
{
    ... TransactionTicket;

public TransactionTicket required();

public TransactionTicket requiresNew();

public void setRollbackOnly();

public int getStatus();

public void commitLevel(TransactionTicket
txticket);

public void leaveLevel(TransactionTicket
txticket);

public void registerSynchronization(String SID,
Synchronization sync);

public Synchronization
getRegisteredSynchronization(String SID);
}
```

410 → (interface line)
420 → required()
430 → requiresNew()
440 → setRollbackOnly()
450 → getStatus()
460 → commitLevel
470 → leaveLevel
480 → registerSynchronization
490 → getRegisteredSynchronization

FIG. 4

```
Synchronization Interface 500 interface javax.transaction.Synchronization
{
    public void beforeCompletion();        ← 510
    public void afterCompletion(int status); ← 520
}
```

*FIG. 5*

SYSTEM AND METHOD FOR A TRANSACTION MANAGER

TECHNICAL FIELD

Embodiments of the invention generally relate to the field of data store transactions and, more particularly, to a system and method for a transaction manager.

BACKGROUND

Many businesses provide access to their products and services through applications that are delivered over computer networks such as the Internet. These applications typically have a multi-tiered architecture. In those cases where the applications are delivered over the Internet they are commonly referred to as Web-based applications. FIG. 1 is a block diagram of a Web-based application 100 having a multi-tiered architecture.

Web-based application 100 includes client layer 110, application layer 120, and data layer 130. Client layer 110 includes user interface 112 that runs on a client computing device such as a desktop computer, laptop computer, personal digital assistant, telephone, and the like. In a Web-based environment, user interface 112 is typically a Web browser. User interface 112 may collect input from a user and provide that input to application layer 120 for processing.

Application layer 120 includes application server 122 to receive and process input from client layer 110. Application server 122 typically includes a number of subcomponents including, for example, connectivity layer 140, presentation logic 142, business logic 144, and database interface 146. Connectivity layer 140 provides connections to client layer 110 using protocols such as the HyperText Transfer Protocol (HTTP), HTTP secured through the Secure Socket Layer, the Simple Object Access Protocol (SOAP), and the like. The HTTP protocol refers to any of the HTTP protocols including, for example, the protocol described in Request For Comments (RFC) 2616 entitled, "HyperText Transport Protocol—HTTP/1.1," June 1999 (hereinafter, the HTTP protocol). The SOAP protocol refers to any of the SOAP protocols including the one promulgated by the World Wide Consortium (W3C) entitled, "SOAP Version 1.1 Part 1: Messaging Framework and Part 2: Adjuncts," 24 Jun. 2003 (hereinafter, the SOAP protocol). The Secure Socket Layer protocol refers to any of the Secure Socket Layer protocols including, for example, the protocol entitled, "The SSL Protocol Ver. 3.0," Nov. 18, 1996 (the HTTPS protocol).

Presentation logic 142 generates a Graphical User Interface (GUI) using, for example, a markup language such as the Hyper Text Markup Language (HTML). Business logic 144 represents the core of the application, for example, the rules governing the underlying business process (or other functionality) provided by the application. The Java 2 Enterprise Edition Specification v1.3, published on Jul. 27, 2001 (the J2EE specification) defines an increasingly popular architecture for application layer 120.

Data layer 130 includes data access logic used by business logic 144 to store and retrieve data in database 132. Database 132 provides non-volatile storage (sometimes referred to as a persistent store) for the data accessed and/or processed by application layer 120. Database 132 may be, for example, a relational database or an object-oriented database. Database interface 146 provides an interface between business logic 144 and data layer 130.

Typically, an application in application layer 120 uses a transaction to interact with persistent data in data layer 130. Related database operations are often grouped together into a unit of work that forms a logical operation from the application's perspective. The term "transaction" refers to such units of work and additionally refers to ensuring that concurrent units of work are executed in an atomic, consistent, isolated, and durable manner as if the concurrent units of work were executed serially one after the other. The term "transaction" refers to a series of database operations that form a unit with regard to backup and synchronization (e.g., a read transaction or a write transaction). The application should (at least to a degree) have some control of the transaction. Controlling transactions is particularly important for Web application 100 because it includes a variety of different component types (e.g., arbitrary Java code, Enterprise JavaBeans, servlets, portals, and the like).

The J2EE specification defines a transaction mechanism in the Java Transaction Application Program Interface (JTA). The JTA applies to standard J2EE components such as Enterprise JavaBeans, Session Beans, and Java Messaging Service components. In the JTA environment, (e.g., with container-managed transactions) transactions are controlled by metadata that is interpreted by, for example, a container. More specifically, JTA provides programmatic transaction demarcation. An Enterprise JavaBean container provides container-managed transactions that are declaratively processed via metadata.

Many applications (e.g., Web application 100) include code (e.g., arbitrary Java code) that is not part of a standard J2EE component. Container-managed transactions, however, are available only for Enterprise JavaBeans. In addition, some of the functionality provided by the JTA environment is not programmatically accessible. That is, the functionality includes private methods that are accessible to, for example, a container but not accessible to an application programmer.

SUMMARY OF THE INVENTION

Embodiments of the invention are generally directed to a system and method for a transaction manager. A transaction manager registers one or more callback methods each having an associated synchronization identifier. An order is defined for the one or more callback methods based, at least in part, on the synchronization identifier associated with each callback method. The callback methods are called in the defined order.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 2A-2B illustrate an example of implicit transaction control according to an embodiment of the invention.

FIGS. 3A-3B illustrate selected aspects of requesting a stacked transaction according to an embodiment of the invention.

FIG. 4 illustrates a transaction manager interface implemented according to an embodiment of the invention.

FIG. 5 illustrates a synchronization interface implemented according to an embodiment of the invention.

DETAILED DESCRIPTION

Figure 1:
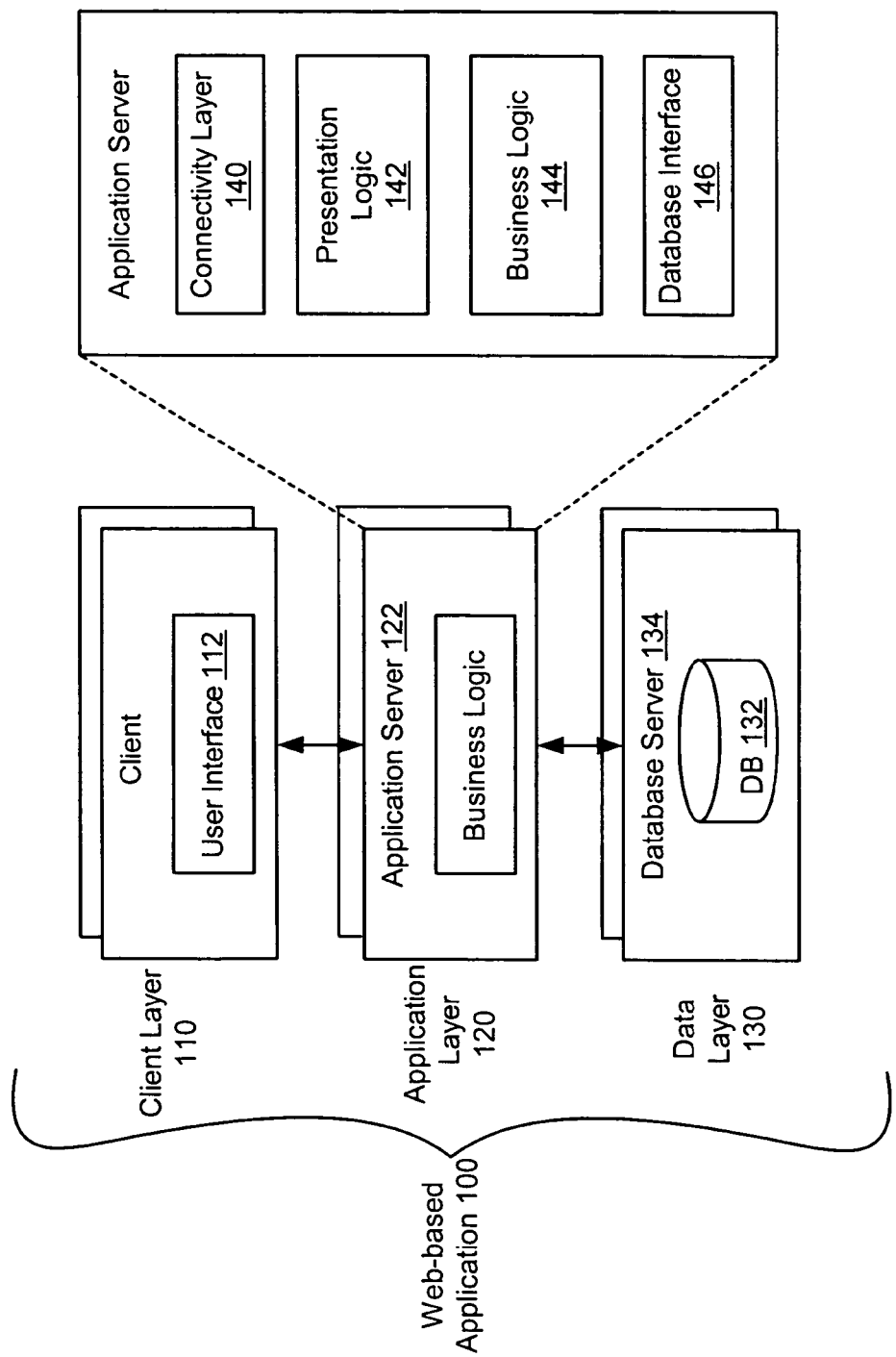
FIG. 1 is a block diagram of a Web-based application having a multi-tiered architecture.

Embodiments of the invention are generally directed to a system and method for a transaction manager. A transaction manager registers one or more callback methods each having an associated synchronization identifier. An order is defined for the one or more callback methods based, at least in part, on the synchronization identifier associated with each callback method. The callback methods are called in the defined order.

A number of transaction control factors are discussed below to describe embodiments of the invention. Each factor is discussed separately and some of the implications of each factor are introduced. After the transaction control factors are introduced, embodiments of the invention are described with reference to the factors.

Selected Factors Relevant to Transaction Control

Data Integrity/Transaction Control

The goal of transactional behavior is for related data changes to be written to a data store in an "all or nothing" mode. The term "data store" broadly refers to any persistent data store including: a file system, a database, a Java Message Service queue, an enterprise information system, and the like. For ease of reference, the term database is sometimes used in this document. Use of the term database (DB) does not limit embodiments of the invention to transaction control on databases. The problem is to know what is "logically related." A component may write its data in one write (or one local transaction (TX)) to the data store, but it does not know the context in which it is being used (e.g., who has called the component and why). Thus each component should be prepared to run in a surrounding TX and should not set a TX demarcation on its own.

In an embodiment, application/component code is generally not allowed to "blindly" call TX control methods directly (e.g., to simply call a commit( )). Instead, the "system" provides TX control at (approximately) the boundaries of a data access request. The term "system" broadly refers to the environment in which the application/component is executing (e.g., an application server). In an embodiment, there is also a mechanism to control TXs for non-request threads (e.g., batch jobs and asynchronous event handlers).

Transaction Isolation Level

Transaction isolation levels determine the extent to which the operation of one transaction can effect the operation of another transaction. In an embodiment, the isolation level is defined by the data store. Different data stores offer different isolation levels, and also incur different overheads for these isolation levels. Note that multiple components can share a data store connection (and an isolation level) without being aware of one another. There are several factors that lead to a common and defined isolation level including: portability, performance, and complexity. In an embodiment, these factors suggest the use of READ_UNCOMMITTED as the default isolation level. In one embodiment, a stacked transaction is used to run independent code with a higher isolation level than READ_UNCOMMITTED (e.g., the READ_COMMITTED isolation level).

Minimize Deadlocks

The term "deadlocks" generally refers to failure to complete a write operation on a data store object. Deadlocks can occur when two transactions write to the same data store object (e.g., the same database row) in different orders. Consider, for example, TX1 writing first to A and then to B at substantially the same time that TX2 is writing first to B and then to A. Both TXs start and do one write but they cannot complete the second write and thus are deadlocked. In one embodiment, as is further described below, a transaction manager controls the order in which callback methods are called. This provides an application programmer the ability to control the overall order of write operations.

Terminology

There are a number of different potential approaches to controlling transactions for code that accesses a data store (e.g., persistence level code). A number of transaction control terms are introduced to facilitate usage of the terms later in the text. "Connection based TX control" refers to getting a connection, using it, and then calling commit or rollback on the connection. These transactions are controlled on the connection level and represent one type of explicit transaction control. "JTA based TX control" refers to using a JTA transaction manager to call methods such as begin, commit, and rollback. JTA based TX control is also a type of explicit transaction control. "Implicit (TXMgr based) TX control" refers to code that does not directly call TX control methods such as begin or commit. Instead, the code provides an indication to a transaction manager that a transaction is requested or that a new transaction is requested.

Basic Transactions

Transaction Control for Application Components Other than J2EE Components

In an embodiment, implicit transaction control is provided for application components that are not Enterprise JavaBean (EJB) components. These components include classes (e.g., Java classes) that offer persistence access via an API and that are typically part of the lower layers of application functionality or libraries. For example, in an embodiment, implicit transaction control is available for code that (a) runs in a Web container (e.g., J2EE), (b) runs in a Web Dynpro container (non-J2EE), and (c) runs in an engine service (non-J2EE). In conventional systems, these classes/methods typically are written using connection based TX control. That is, a TX is opened and closed within a method that writes to the data store. Each method starts and commits its own TX and the callers do not perform any TX control around these method calls. What is missing in conventional systems is the ability to participate in an enclosing TX if one is available.

In contrast, embodiments of the invention enable the "application level" to start a TX, and all write operations called (within that request/operation) to then go into the same TX. The application commits the changes after the write operations are called. Thus, embodiments of the invention allow a class/method to be used whether or not there is an enclosing TX. In this sense, embodiments of the invention emulate the behavior of an Enterprise JavaBean (EJB) container for non-J2EE components. In one embodiment, a transaction manager (TXMgr) provides transaction control methods that emulate the behavior of the transaction control properties of EJB methods.

In an embodiment, the basic approach can be described in the following way. The "real transactions" (and their integration with connections, etc.) exist on the explicit transaction management level (e.g., JTA) level. A TXMgr class offers convenience methods for arbitrary code (e.g., non-EJB components) to manage transactions. The TXMgr may also enforce certain code and runtime disciplines. In an embodiment, the TXMgr controlled code (implicit transaction control) does not allow explicit transaction control (e.g., via JTA). Thus, in an embodiment, direct access to explicit transaction management interfaces (e.g., JTA interfaces) is not needed.

FIGS. 2A-2B illustrate an example of implicit transaction control according to an embodiment of the invention. In an embodiment, implicit transaction control is provided by a transaction manager (TXMgr). The TXMgr is a static class that offers one or more TX control methods. The TXMgr is further discussed below with reference to FIG. 4.

Code example 200 includes transaction header code 210 and transaction footer code 220. In an embodiment, transaction header code 210 and transaction footer code 220 provide the transaction control code for non-J2EE application components. Transaction header code 210 includes transaction identifier 212 and required( ) method 214. In an embodiment, transaction identifier 212 denotes that required( ) method 214 is associated with a particular transaction. Required( ) method 214 provides an implicit indication that example code 200 is to be executed within a transaction. While the method name "required( )" is shown to illustrate the emulation of EJB container managed transactions, the method may have a different name in an alternative embodiment.

Required( ) method 214 has the following meaning. If no TX is open, then open one (e.g., on the JTA level) and return the transaction identifier (e.g. txticket) that denotes this transaction. If a TX is open, then simply return a txticket (e.g., without opening a TX). The latter case is called a "virtual transaction" since it only exists at the TXMgr level but not, for example, the JTA level.

When an exception occurs or a semantic consistency check fails, the application code (e.g., code 200) calls, for example, TXMgr.setRollbackOnly( ) 222. This results in the current enclosing TX to be rolled back when commitLevel( ) 224 is subsequently attempted. In an embodiment, setRollbackOnly( ) 222 can be called anywhere in lower level methods. Thus an error condition that is detected on a low level, can immediately flag the "current top transaction" as invalid at that point.

When code example 200 is finished interacting with the DB, commitLevel( ) method 224 is called. CommitLevel method 224 passes txticket 212 to the TXMgr. Txticket 212 specifies which "required" (or "requires new") method is the "owner" of this TX (e.g., required method 214). In the illustrated embodiment, required method 214 "owns" the TX identified by txticket 212. In an embodiment, required method 214 opened either a "real" TX or a "virtual" TX. If required( ) method 214 opened a "real" TX, then commitLevel( ) method 224 terminates the transaction (e.g., on the JTA level). If setRollbackOnly( ) has not been invoked, then commitLevel will do an actual transaction commit. Otherwise, commitLevel will roll back the transaction. If, on the other hand, required( ) method 214 opened a virtual TX, then commitLevel( ) 224 does not effect the transaction (e.g., a no-op). "Real" and "virtual" TXs are further described below with reference to FIGS. 3A-3B.

When the method is done, the leaveLevel( ) method 226 is called passing the txticket 212 that denotes the required method 214. When commitLevel( ) has not been invoked, leaveLevel will ensure that the current transaction is rolled back. When the required( ) call 214 really did open a TX, then this leaveLevel will roll back the transaction (e.g., on the JTA level). Otherwise, leaveLevel will produce the equivalent of invoking setRollbackOnly( ) on the transaction.

In an embodiment, transaction header code 210 and transaction footer code 220 are inserted into code (e.g., methods) to make the code transactional. Inserting this code into the methods that should have transactions allows the components to be used within both contexts: Those with a TX provided by the outside/caller and those without. In an embodiment, the latter is important for migration of existing code. This model of transaction control is called "implicit (TXMgr based) transaction control."

Error Handling with Txticket

In an embodiment, transaction identifiers (e.g., txticket 212) detect errors in the control flow that would otherwise be very hard to find. In one embodiment txtickets conform to the following rules. Txtickets are all distinct so that at each "call location" the TXMgr can match the corresponding required( ), commitLevel( ), and leaveLevel( ) calls. At the leaveLevel( ) or commitLevel( ) call, the passed txticket is matched by the TXMgr with an internally kept stack of passed out txtickets. The passed txticket must be equal to the one on the top of the internal ticket stack, and is then "popped" from the stack. In an embodiment, there is exactly one corresponding leaveLevel( ) call for each required( ) call and for each requiresNew( ) call. A txticket can then only be used once for a leaveLevel( ). In an embodiment, there is at most one corresponding commitLevel( ) call for each required( ) call and for each requiresNew( ) call. A txticket can then only be used once for a commitLevel( ). Thus, duplicate commits of the same transaction can be detected immediately.

Real and Virtual Transactions

In an embodiment, the term "real" transaction refers to a transaction on the JTA level (or other explicit transaction management interface level). The term "virtual" transaction refers to instances in which the TXMgr encloses a transactional operation within a preexisting transaction. In an embodiment, the required( ) and commitLevel(txTicket) methods have the following behavior. Only the outer-most required( )method actually opens a JTA transaction (through TXMgr to JTA), all lower instances are simply no-ops since there already is an active TX. Thus, only the outer-most required( ) method has a real transaction associated with it. Accordingly, in an embodiment, only the outer-most commitLevel( ) method actually commits a real transaction, since the others are no-ops (e.g., just txticket for stack discipline check).

As is further described below with reference to FIGS. 3A-3B, the requiresNew( ) method creates a new real transaction. In an embodiment, only the outer-most TXMgr.required( ) call and each TXMgr.requiresNew( ) call create a real JTA transaction. For ease of discussion, these transactions are called "real TXMgr transactions." In one embodiment, all other (those below the topmost) TXMgr.required( ) calls result in "no-op" transactions. These transactions are called "virtual TXMgr transactions." Real transactions can be nested using stacked transactions. Thus, at runtime a stack of real transactions mixed with virtual transactions is possible. In an embodiment, all methods on TXMgr other than commitLevel( ), (e.g., setRollbackOnly( ), callback registration, getStatus, etc.) always apply to the current inner-most real transaction.

Stacked Transactions

In an embodiment, stacked transactions are supported. Opening a stacked transaction means that the current JTA (DB) TX is suspended and a new independent JTA (DB) TX is opened. Database operations can be performed in the new independent (or simply stacked) transaction. This stacked TX can be committed/rolled back, and then the previously suspended TX is resumed again. In an embodiment, stacking can be done for multiple levels.

In an embodiment, stacking applies to the control flow in the program, but not to the database transaction level. That is, transaction tickets are used to identify an "owner" of a transaction. In an embodiment, the transaction tickets are created and stacked internally by the TXMgr. This means that a stacked (sub) transaction is completely independent from the higher TX on the database (or other data store), unlike nested database (DB) transactions where a rollback of an enclosing DB TX also rolls back a previously committed sub-TX.

FIGS. 3A-3B illustrate selected aspects of requesting a stacked transaction according to an embodiment of the invention. In an embodiment, stacked transactions are requested using requiresNew method 310. The resulting txticket denotes this TX. In an embodiment, requiresNew 310 always opens a real transaction because the TXMgr opens a JTA TX responsive, at least in part, to requiresNew 310. CommitLevel( ) method 312 does a commit or rollback on the stacked transaction. LeaveLevel( ) method 314 does a rollback on the stacked transaction if commitLevel( ) 312 has not been invoked and then resumes the previous (e.g., one layer above) transaction. In an embodiment, the TXMgr compares the internally stacked txticket with the passed txticket in order to detect mismatches at the commitLevel( ) and at the leaveLevel( ) calls.

Transaction Synchronization

As discussed above, some methods are offered for transaction control, but other than these calls, applications may still use DB connections for read and write as before. This approach is enough for simple applications. Complex applications with high performance requirements, however, may need to go one step further. In an embodiment, applications do not "directly" write to the data store. Instead, they register their "write methods" with the TXMgr and do the actual writing within a callback triggered by the TXMgr at the very end of the transaction.

In an embodiment, one transaction callback registration results in two callbacks: beforeCompletion( ) and aftercompletion(int status). As the name implies, the method "beforeCompletion( )" is called before the commit. The method "afterCompletion(int status)" is called after the completion of the transaction. The passed argument in the aftercompletion(int status) method defines whether this is after a successful commit or a rollback. In an embodiment, these callbacks are called by the TXMgr at the very end of the request just before and after the actual DB commit (or rollback). TXMgr registers itself with, for example, JTA so that the TXMgr callbacks are called inside the proper JTA callbacks.

Callback controlled writing provides several benefits including: better write performance on a DB, better buffering/array updates, minimize deadlocks, and synchronization of memory state/caches. As is further described below, callback ordering is determined using a synchronization identifier (SID) that is passed at callback registration.

Synchronization of Memory State after Commit/Rollback

Temporary data that is to be written to the DB is stored in memory until it is written to the DB. In some cases, there are also caches that mirror the DB state for some high usage objects and applications that keep the caches consistent with the DB state. This should work whether changes to the DB are committed, or rolled back, for example, due to an error. Keeping caches consistent with the DB is a task that can benefit from transaction callbacks. In an embodiment, cache synchronization/memory cleanup can be performed in the "afterCompletion( )" method.

Performance—Collecting Changes into Array Updates

In an embodiment, callbacks allow very efficient array updates to be performed. When many (often little) records have to be written, it is much more expensive to have many little write operations to the DB than one big "array update" that collects all writes in one Structured Query Language (SQL) statement. In order to do a maximally efficient array update, the persistence layers of components should collect all individual changes, and then combine it into one array update. To accomplish this, they can register for a transaction callback, and then create the write statement in the before Completion( ) method.

Minimizing Deadlocks

In an embodiment, the callback methods reduce the possibility of deadlocks. The problem is that in general, component interaction is very complex and the ordering of write operations may even depend on the order of user interactions or other factors that are hard to control. To avoid deadlocks one should control the ordering of DB write operations. In an embodiment, the TXMgr controls the ordering of DB write operations using callback methods.

The idea is that instead of the application writing to the DB directly, it registers the methods that do the writing with the TXMgr using a SID. The SIDs are used by the TXMgr to define the ordering of the callbacks (e.g., some canonical order) so that, in an embodiment, they are always the same. Note that the ordering is defined by the system (TXMgr) but not known to the application. Thus, the application cannot predict the order of the callbacks. In an embodiment, the callback order has nothing to do with the registration order. In an embodiment, the DB write operations are performed in the beforeCompletion methods.

Callback Execution

Callbacks are registered with the TXMgr passing a SID and an object instance. The SID is used by the TXMgr to define a canonical order for the callbacks. The application cannot rely on the callback order. In an embodiment, the granularity of SIDs/registrations can differ. Some applications may register specific objects (e.g., a business object that writes its own data), others may register persistence managers (typically component level granularity) that write all collected changes within one array update.

In an embodiment, all callback registrations are kept at the "currently active" transaction level. Thus, when a first "TXMgr.required( )" call creates a TX, and a subsequent "TXMgr.required( )" call does not, all callbacks registered after the first "TXMgr.required( )" call will be called when that particular transaction (identified by txticket) is committed or rolled back. Since stacked transactions are possible, there may be registrations kept at several levels. The "commitLevel(txticket)" at each real transaction executes the callbacks and then of course discards the registrations along with the TX.

In an embodiment, a "commitLevel(txticket)" that commits a real transaction does the following. When the TX is in "rollback_only" status, the commit immediately turns into a rollback. For a commit, all registered beforeCompletion( ) methods are called in the defined order. Within the before Completion( ) callbacks, an application can call TXMgr.setRollbackOnly( ) which essentially stops the before Completion callback loop and sets the TX into rollback mode. When all beforeCompletion methods are done, and the TX is not in "rollbackOnly" mode, a JTA level commit is performed. If the TX is in rollbackOnly mode, a JTA rollback is performed. In either case (commit and rollback), the afterCompletion callbacks are called in the end. All of the methods are called and setRollbackOnly( ) has no effect in this phase.

In an embodiment, JTA is the master for the "real transaction" and TXMgr is the slave for processing the callbacks. The TXMgr registers itself with JTA for the transaction synchronization callbacks. Thus, a TXMgr.commit( ) will only call a JTA commit when the real JTA transaction has been started by the call associated with this txticket. When a JTA commit happens, JTA calls its beforeCompletion( )s, which invoke the TXMgr beforeCompletion implementation. This in turn loops through all TXMgr-registered beforeCompletion calls in the defined order. After the commit (and also the rollback), JTA calls its afterCompletion( ), which calls the TXMgr afterCompletion implementation. This again loops through all TXMgr-registered afterCompletion calls in the defined order.

FIG. 4 illustrates transaction manager interface 400 implemented according to an embodiment of the invention. In the illustrated embodiment, transaction manager interface 400 includes the following: TransactionTicket 410, method required( ) 420, method requiresNew( ) 430, method setRollbackOnly( ) 440, method getStatus( ) 450, method commitLevel(txticket) 460, method leaveLevel(txticket) 470, method registerSynchronization(String SID, Synchronization sync) 480, and method getRegisteredSynchronization (String SID) 490. In an alternative embodiment, transaction manager interface 400 may include more methods, fewer methods, and/or different methods.

In an embodiment, TransactionTicket 410 is a tag used to identify instances of required( ) and requiresNew( ) calls. Having a TransactionTicket identifies the owner of a TX. The TXMgr creates the txtickets for the "required" calls and also stacks them internally. At commit(ticket) it compares the passed ticket with the internally stacked ticket. This allows immediate error detection for mismatch problems. The txticket provides a mechanism to determine if a TX was really opened, or if the "required" call was a "NO-OP."

In an embodiment, method required( ) 420 creates a TX when there is no TX open. If, however, a TX is open, then the open TX is used. In both cases the txticket is stacked internally. The method requiresNew( ) 430 creates a TX and suspends a current TX. The method setRollbackOnly( ) 440 sets a flag on the current TX indicating that it cannot be committed. An attempted commit then turns into a rollback on the JTA level. The method getStatus( ) 450 returns the current status of the JTA transaction.

It is to be appreciated that directly stacking the txtickets is one of a number of ways for maintaining a transaction stack. In general, the TXMgr maintains a transaction stack corresponding to required( ) (or requiresNew( ))/leaveLevel( ) methods. The txticket provides a mechanism for identifying a position in the stack. Stacking the txticket itself is one way to identify the position in the stack. In an alternative embodiment, the txticket contains the stack depth at the time of txticket creation plus some identifier that allows for validating whether the "thing at that stack position" really corresponds to the txticket.

The method commitLevel(txticket) 460 commits this TX. In an embodiment, the commit must be used only for TXs that were opened with required( ) or requiresNew( ), and the txticket must match to be able to commit. It cannot be used to commit any other TX since one does not have the ticket for the TX (e.g., it is not the owner of that TX). In addition, commit performs the following actions. The commit determines whether the RollbackOnly flag is set for current TX. If so, then the commit turns into a rollback (e.g., the JTA rollback is called). The commit loops through all registered callbacks (in order defined by SIDS) and calls beforeCompletion and afterCompletion as defined in the interface.

The method leaveLevel(txticket) 470 closes processing of a TX level. In an embodiment, it must be used only for TXs that were opened with required( ) or requiresNew( ), and the txticket must match. Method leaveLevel 470 cannot be used on any other TX since one does not have the ticket for the TX (e.g., it is not the owner of that TX). In addition, leaveLevel 470 will roll back the current TX if commitLevel( ) has not been invoked on the TX.

The method registerSynchronization(String SID, Synchronization sync) 480 registers a callback to be called before and after completion (commit or rollback). In an embodiment, this always applies to the current TX. Thus, it is also stacked as TX state. The SID parameter is used to control the ordering of write operations to avoid deadlocks. SIDs should use a namespace to avoid unwanted collisions. In one embodiment, when a pair (SID, sync) is passed twice for the same TX, the second registration is ignored, for example, there will be only one callback (both methods beforeCompletion and afterCompletion).

The method getRegisteredSynchronization(String SID) 490 retrieves a previously registered callback object. This is typically used so that a persistence manager can maintain a "write context" between many calls that logically belong to the transaction, and can be retrieved between calls. Thus at each "write operation" the proper persistence manager instance (for this thread) can be retrieved, and the object reference stored in some "write collection".

FIG. 5 illustrates synchronization interface 500. In one embodiment, synchronization interface 500 is a JTA synchronization interface. In an embodiment, synchronization interface 500 interface is used to call back to objects that have registered themselves at the TXMgr using its registerSynchronization method. The methods beforeCompletion( ) 510 and afterCompletion( ) 520 are discussed above with reference to callback synchronization.

Figure 6:
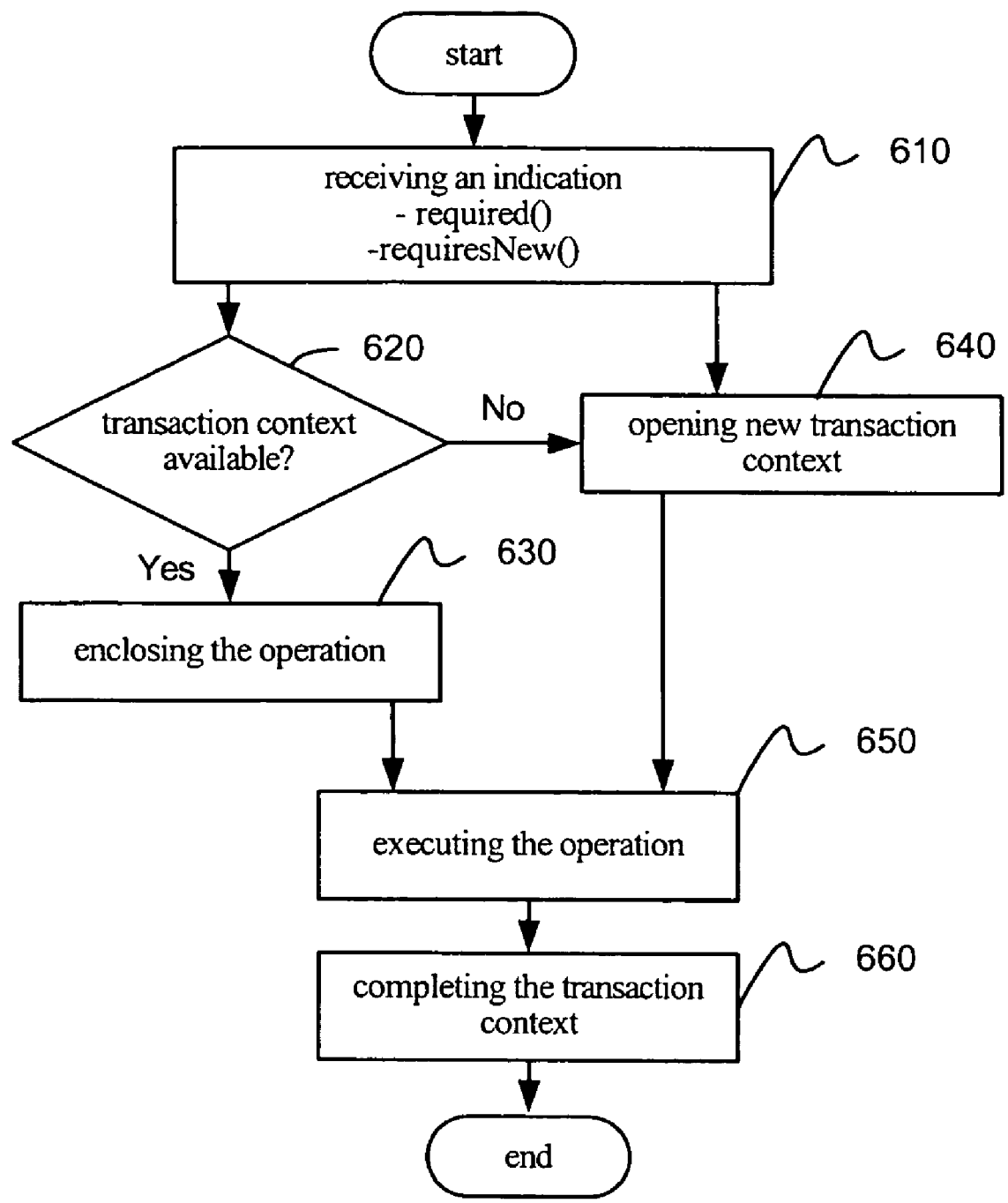
FIG. 6 is a flow diagram illustrating certain aspects of a method for implicit transaction control, according to an embodiment of the invention.
Figure 7:
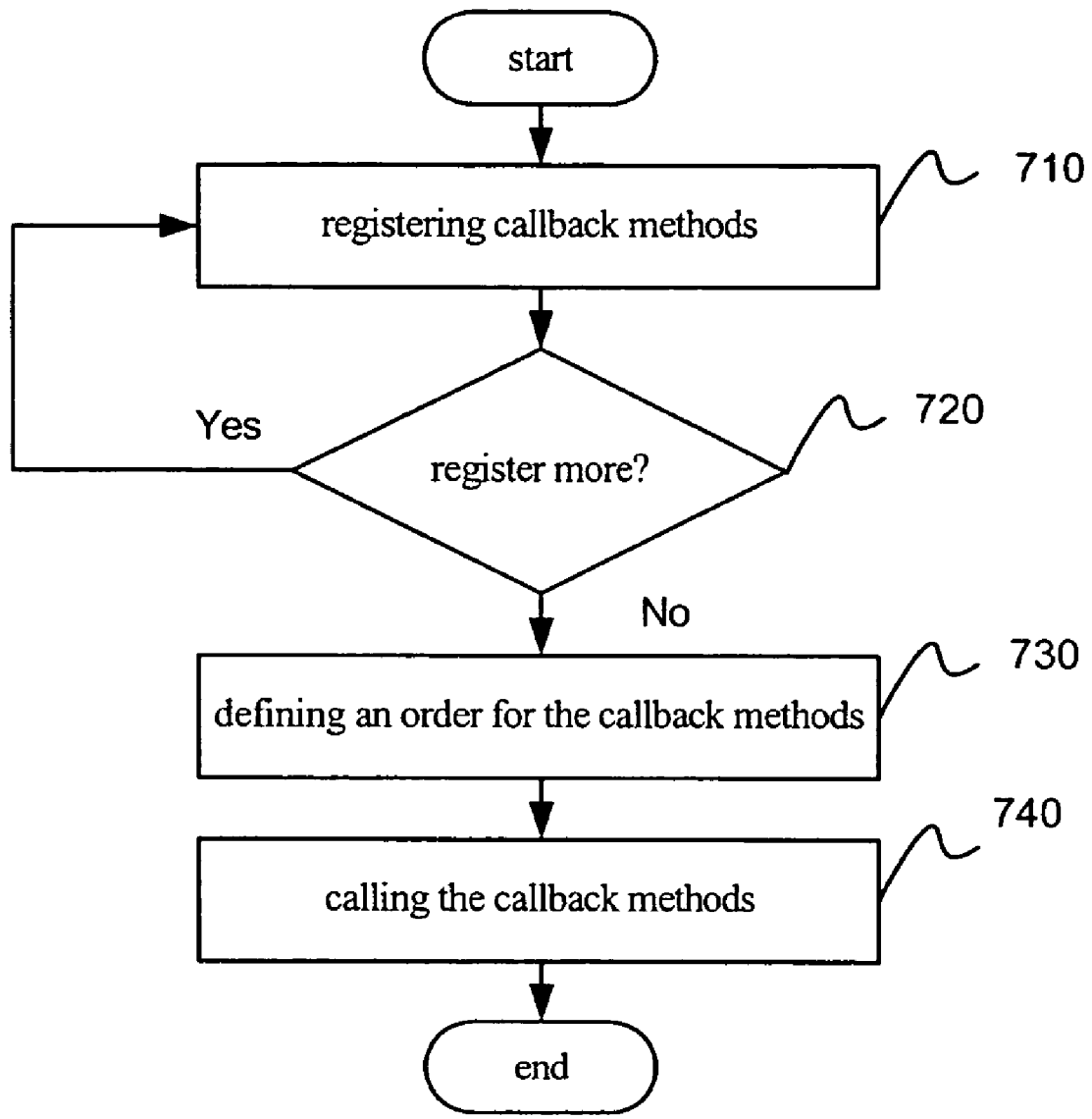
FIG. 7 is a flow diagram illustrating certain aspects of a method for transaction control, according to an embodiment of the invention.

Turning now to FIGS. 6-7, the particular methods associated with embodiments of the invention are described in terms of computer software and hardware with reference to a flowchart. The methods to be performed by a computing device (e.g., an application server) may constitute state machines or computer programs made up of computer-executable instructions. The computer-executable instructions may be written in a computer programming language or may be embodied in firmware logic. If written in a programming language conforming to a recognized standard, such instructions can be executed on a variety of hardware platforms and for interface to a variety of operating systems. In addition, embodiments of the invention are not described with reference to any particular programming language. It will be appreciated that a variety of programming languages may be used to implement embodiments of the invention as described herein. Furthermore, it is common in the art to speak of software, in one form or another (e.g., program, procedure, process, application, etc.), as taking an action or causing a result. Such expressions are merely a shorthand way of saying that execution of the software by a computing device causes the device to perform an action or produce a result.

FIG. 6 is a flow diagram illustrating certain aspects of a method for implicit transaction control, according to an embodiment of the invention. A transaction manager (TXMgr) receives an indication that, for example, a series of operations/unit of work/piece of code is to be executed in a transaction at 610. In one embodiment, the indication is a call to method required( ) or method requiresNew( ) (e.g., having the semantics described above). In an alternative embodiment, the indication may be a different method call, procedure call, instruction, and the like.

If the indication is a call to required( ), then the TXMgr determines whether a preexisting transaction context is available at 620. In one embodiment, determining whether the transaction context is available refers to determining whether the application has already opened a transaction. If the preexisting transaction context is available, the TXMgr encloses the series of operations/unit of work/piece of code within the preexisting transaction context at 630. If no transaction context is available, then the TXMgr opens a new transaction context at 640. Also, if the indication is a call to requires New( ), the TXMgr opens a new transaction context at 640. The operation is executed within the transaction context at 650.

In an embodiment, the TXMgr completes the transaction context after the operation is executed as shown by 660. If a new transaction context was opened (e.g., because a preexisting transaction context was not available), then "completing the transaction" may include calling a commit method of an explicit transaction management interface. In one embodiment, the explicit transaction management interface is the Java Transaction Application Program Interface (JTA). If the operation was executed within a preexisting transaction context, then "completing the transaction" may be a no-op.

FIG. 7 is a flow diagram illustrating certain aspects of a method for transaction control, according to an embodiment of the invention. In an embodiment, selected transaction control functionality is made accessible to application programmers. This transaction control functionality may include functionality that is encapsulated in private methods in conventional systems. In one embodiment, this functionality is provided in public methods so that it is programmatically accessible. For example, under JTA, certain low-level functions (e.g., callback synchronization functions) are defined to be private and are, therefore, not programmatically accessible. In an embodiment, callback synchronization functions are provided as public methods so that they are programmatically accessible.

Referring to process block 710, one or more callback methods are registered with a TXMgr. More precisely, the TXMgr is used to register the callback methods with the current transaction. In an embodiment, the callback methods are programmatically registered by an application. Each callback method may be associated with a synchronization identifier. Applications and/or associated manager code may register a number of callbacks as shown by 720. In an embodiment, the TXMgr defines an order for the registered callback methods based, at least in part, on the synchronization identifier at 730. Referring to process block 740, the callback methods are called in the order defined at 730.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A computer-implemented method comprising:
    requesting a transaction from a transaction manager for an application and establishing a transaction context for the application, wherein components of the application run in one of the group consisting of a Web container, a non-Java container, and an engine service;
    registering a plurality of callback methods with the transaction manager, wherein each of the callback methods is associated with a synchronization identifier, and wherein registering the plurality of callback methods comprises:
        collecting a plurality of updates for a plurality of database records,
        creating an array update based, at least in part, on the plurality of updates for the plurality of database records, and
        registering a callback method corresponding to the array update with the transaction manager;
    defining an order for the plurality of callback methods, the transaction manager defining the order based, at least in part, on the synchronization identifier associated with each callback method; and
    responsive at least in part to the transaction context being ready to complete, calling the one or more callback methods in the defined order.

2. The method of claim 1, wherein the transaction manager provides implicit transaction control for the components of the application, and wherein the components of the application do not directly call transaction control methods.

3. The method of claim 2, wherein explicit transaction control is not allowed by the transaction manager.

4. The method of claim 2, wherein the transaction manager is registered with an explicit transaction management interface for the callback methods.

5. The method of claim 4, wherein the explicit transaction management interface is the Java Transaction API (JTA).

6. The method of claim 4, further comprising calling a commit method of the explicit transaction management interface to complete the transaction.

7. The method of claim 1, wherein the components of the application are not Enterprise Java Beans (EJBs).

8. The method of claim 1, wherein the transaction manager comprises a static class that includes one or more transaction control methods.

9. An apparatus comprising:
an application, the application to request a transaction from a transaction manager, wherein components of the application are to run in one of the group consisting of a Web container, a non-Java container, and an engine service; and
a processor and logic executable thereon to:
establish a transaction context for the application;
register a plurality of callback methods with the transaction manager, wherein each callback method is associated with a synchronization identifier, and wherein registering the plurality of callback methods comprises:
collecting a plurality of updates for a plurality of database records,
creating an array update based, at least in part, on the plurality of updates for the plurality of database records, and
registering a callback method corresponding to the array update with the transaction manager;
define an order for the plurality of callback methods, the transaction manager defining the order based, at least in part, on the synchronization identifier associated with each callback method;
responsive at least in part to the transaction context being ready to complete, calling the plurality of callback methods in the defined order.

10. The apparatus of claim 9, wherein the transaction manager is to provide implicit transaction control for the components of the application, and wherein the components of the application do not directly call transaction control methods.

11. The apparatus of claim 10, wherein the transaction manager is registered with an explicit transaction management interface for the callback methods.

12. The apparatus of claim 9, wherein the components of the application are not Enterprise Java Beans (EJBs).

13. A system comprising:
means for storing an application on a computer;
means for executing the application on the computer, the means including a processor;
means for requesting a transaction from a transaction manager for the application and establishing a transaction context for the application, wherein components of the application are to run in one of the group consisting of a Web container, a non-Java container, and an engine service;
means for registering a plurality of callback methods with the transaction manager, wherein each of the callback methods is associated with a synchronization identifier and wherein the means for registering the plurality of callback methods comprises:
means for collecting a plurality of updates for a plurality of database records,
means for creating an array update based, at least in part, on the plurality of updates for the plurality of database records, and
means for registering a callback method corresponding to the array update with the transaction manager;
means for defining an order for the plurality of callback methods, the transaction manager defining the order based, at least in part, on the synchronization identifier associated with each callback method; and
means for calling the plurality of callback methods in the defined order responsive, at least in part, to the transaction context being ready to complete.

14. The system of claim 13, further comprising means for providing implicit transaction control for the components of the application.

15. The system of claim 14, further comprising means for disallowing explicit transaction control.

16. The system of claim 13, further comprising means for registering the transaction manager with an explicit transaction management interface for the callback methods.

17. The system of claim 16, further comprising means for calling a commit method of the explicit transaction management interface to complete the transaction.

18. The system of claim 13, wherein the components of the application are not Enterprise Java Beans (EJBs).

19. An article of manufacture comprising:
a computer-readable medium including instructions that, when accessed by a processor, cause the computer to perform operations comprising:
requesting a transaction from a transaction manager for an application and establishing a transaction context for the application, wherein components of the application run in one of the group consisting of a Web container, a non-Java container, and an engine service;
registering a plurality of callback methods with the transaction manager, wherein each of the callback methods is associated with a synchronization identifier, wherein registering the plurality of callback methods comprises:
collecting a plurality of updates for a plurality of database records,
creating an array update based, at least in part, on the plurality of updates for the plurality of database records, and
registering a callback method corresponding to the array update with the transaction manager;
defining an order for the plurality of callback methods, the transaction manager defining the order based, at least in part, on the synchronization identifier associated with each callback method; and
calling the plurality of callback methods in the defined order responsive, at least in part, to the transaction context being ready to complete.

20. The article of manufacture of claim 19, wherein the transaction manager provides implicit transaction control for the components of the application, and wherein the components of the application do not directly call transaction control methods.

21. The article of manufacture of claim 19, wherein the medium further includes instructions that, when accessed by a processor, cause the computer to perform operations comprising:
programmatically registering the one or more callback methods from an application.

22. The article of manufacture of claim 19, wherein the medium further includes instructions that, when accessed by a processor, cause the computer to perform operations comprising:
registering the transaction manager with an explicit transaction management interface; and
calling a commit method of the explicit transaction management interface to complete the transaction.

23. The article of manufacture of claim 19, wherein the order of callback methods controls an overall order of write operations.

* * * * *